(12) United States Patent
Lin et al.

(10) Patent No.: US 9,436,305 B2
(45) Date of Patent: Sep. 6, 2016

(54) TOUCH DISPLAY APPARATUS

(71) Applicant: InnoLux Corporation, Jhu-Nan, Miao-Li County (TW)

(72) Inventors: Kuan-Li Lin, Jhu-Nan (TW); Wen-Jyh Sah, Jhu-Nan (TW); Cheng-Hsia Kuo, Jhu-Nan (TW)

(73) Assignee: INNOLUX CORPORATION, Jhu-Nan, Miao-Li County (TW)

( * ) Notice: Subject to any disclaimer, the term of this patent is extended or adjusted under 35 U.S.C. 154(b) by 243 days.

(21) Appl. No.: 14/221,991

(22) Filed: Mar. 21, 2014

(65) Prior Publication Data

US 2014/0285734 A1 Sep. 25, 2014

Related U.S. Application Data

(60) Provisional application No. 61/804,429, filed on Mar. 22, 2013.

(30) Foreign Application Priority Data

Jul. 17, 2013 (TW) .............................. 102125559 A

(51) Int. Cl.
*G02F 1/1335* (2006.01)
*G02F 1/1333* (2006.01)
*G06F 3/041* (2006.01)
*G06F 1/16* (2006.01)

(52) U.S. Cl.
CPC ............. *G06F 3/041* (2013.01); *G06F 1/1643* (2013.01); *G02F 1/13338* (2013.01); *G02F 1/133308* (2013.01)

(58) Field of Classification Search
CPC .................................................. G02F 1/13338
See application file for complete search history.

(56) References Cited

U.S. PATENT DOCUMENTS

2008/0246741 A1* 10/2008 Hinata ..................... G06F 3/045
345/173
2010/0039578 A1* 2/2010 Roh .................. G02F 1/133604
349/58
2012/0182492 A1* 7/2012 Ro ...................... B29C 45/1418
349/58

FOREIGN PATENT DOCUMENTS

TW 201120506 A 6/2011

\* cited by examiner

*Primary Examiner* — Wen-Ying P Chen
(74) *Attorney, Agent, or Firm* — Muncy, Geissler, Olds & Lowe, P.C.

(57) ABSTRACT

A touch display apparatus comprises a display panel and a touch panel. The display panel includes a first substrate and a second substrate disposed oppositely. The first substrate has a first side, the second substrate has a second side corresponding to the first side, and the first side is disposed beyond the second side. The touch panel includes a touch substrate. The second substrate is disposed between the touch substrate and the first substrate, and the area of the touch substrate is less than or equal to that of the second substrate.

15 Claims, 19 Drawing Sheets

TOUCH DISPLAY APPARATUS

CROSS REFERENCE TO RELATED APPLICATIONS

This application claims the priority benefit of U.S. provisional application Ser. No. 61/804,429 filed on Mar. 22, 2013, and a Patent Application No. 102125559 filed in Taiwan on Jul. 17, 2013. The entirety of the above-mentioned patent applications is hereby incorporated by reference herein and made a part of specification.

BACKGROUND OF THE INVENTION

1. Field of Invention

The invention relates to a touch display apparatus.

2. Related Art

With the progress of technologies, various novel information apparatuses, such as cell phones, tablet computers, ultrabooks and GPS navigation apparatuses, are invented. Generally, a keyboard and mouse are commonly used to manipulate the information apparatus for inputting information. Nevertheless, the touch control technology currently also becomes a popular manipulation method for the information apparatus and brings an intuitive operation. Accordingly, a touch display apparatus using the touch control technology can provide a friendly and intuitive interface for the input operation, and therefore a user can manipulate the touch display apparatus by fingers or a stylus.

In general, the touch display apparatus can be divided into an in cell touch display apparatus and an on cell touch display apparatus. In the in cell touch display apparatus, a sensing electrode layer is disposed in a display panel (e.g. LCD panel); otherwise, in the on cell touch display apparatus, a touch panel including a sensing electrode layer is disposed on a display panel.

SUMMARY OF THE INVENTION

An objective of the invention is to provide a touch display apparatus that is with an innovative structure and advantageous for reducing the cost.

A touch display apparatus according to the invention comprises a display panel and a touch panel. The display panel includes a first substrate and a second substrate disposed oppositely. The first substrate has a first side, the second substrate has a second side corresponding to the first side, and the first side is disposed beyond the second side. The touch panel includes a touch substrate. The second substrate is disposed between the touch substrate and the first substrate, and the area of the touch substrate is less than or equal to that of the second substrate.

In one embodiment, the touch substrate has a third side, and the second substrate has a side corresponding to the third side.

In one embodiment, the third side is disposed beyond the side of the second substrate corresponding to the third side.

In one embodiment, the touch display apparatus further comprises a buffer element disposed between the touch substrate and the first substrate and adjacent to the third side of the touch substrate.

In one embodiment, the buffer element has a lengthwise direction, and along the lengthwise direction, the buffer element has a first length, the first substrate has a second length and the touch substrate has a third length. The first length is less than or equal to the second length and is larger than or equal to the third length.

In one embodiment, the touch display apparatus further comprises a circuit connection board disposed to the touch substrate and electrically connected to the touch substrate.

In one embodiment, at least a portion of the circuit connection, board overlaps the first substrate.

In one embodiment, at least a portion of the circuit connection board overlaps the second substrate.

In one embodiment, the display panel further includes an optical film which is disposed between the second substrate and the touch substrate.

In one embodiment, the touch display apparatus further comprises a backlight module, a plastic frame and a back plate. The backlight module is disposed on the side of the display panel away from the touch substrate. The plastic frame is adjacent to the backlight module, and the display panel is disposed to the plastic frame. The plastic frame and the backlight module are disposed to the back plate.

In one embodiment, the plastic frame and the back plate are connected to each other by locking or adhesion.

In one embodiment, the touch display apparatus further comprises a backlight module, an adhesive element and a back plate. The backlight module is disposed on the side of the display panel away from the touch substrate. The touch substrate and the display panel are connected to each other by the adhesive element. The backlight module is disposed to the back plate.

In one embodiment, the touch display apparatus further comprises a light blocking element extending from the back plate to the edge of the touch substrate.

In one embodiment, the touch display apparatus further comprises a front frame. The front frame is disposed at the edge of the touch substrate and includes a blocking portion, which is disposed above the touch substrate and has a surface. An angle is formed between an extension of the surface and an upper surface of the touch substrate, and the angle is between 5° and 30°.

As mentioned above, in the touch display apparatus according to the invention, the display panel includes a first substrate and a second substrate disposed opposite to each other, the first substrate has a first side, the second substrate has a second side corresponding to the first side, and the first side is disposed beyond the second side. Besides, the touch panel includes a touch substrate. The second substrate is disposed between the touch substrate and the first substrate, and the area of the touch substrate is less than that of the second substrate. Thereby, in comparison with the conventional touch display apparatus, the touch display apparatus of this invention is configured with an innovative structure and uses the smaller touch panel, and therefore the cost of the touch display apparatus can be reduced.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
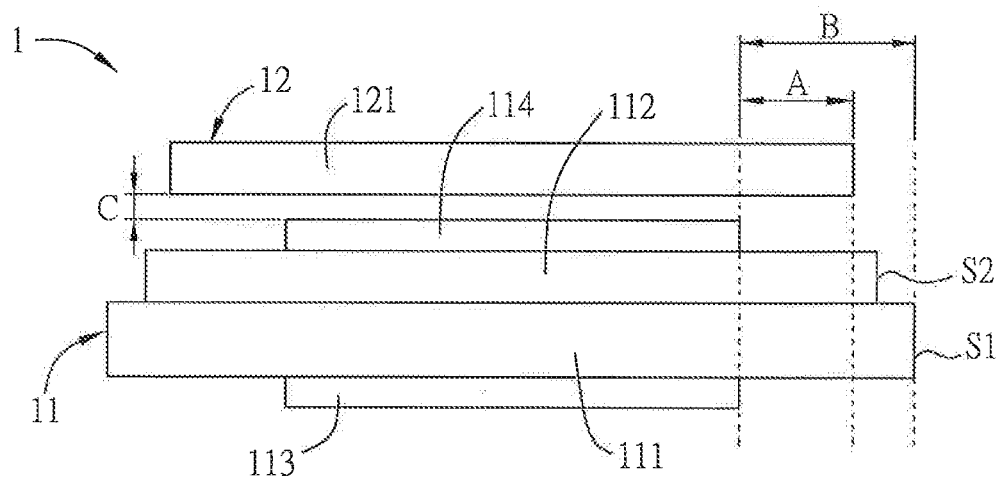
FIG. 1 is a schematic diagram of a touch display apparatus according to a preferred embodiment of the invention.

FIG. 1 is a schematic diagram of a touch display apparatus according to a preferred embodiment of the invention.

The touch display apparatus 1 includes a display panel 11 and a touch panel 12.

The display panel 11 includes a first substrate 111, a second substrate 112 and an optical film. The first substrate 111 and the second substrate 112 are disposed oppositely. The display panel 11 can be a liquid crystal display (LCD) panel or an organic light emitting diode (OLED) display panel. In this embodiment, the display panel 11 is an LCD panel for example. The materials of the first substrate 111, second substrate 112 and touch panel 12 can include glass, and they can be made by the same or different glass. In this embodiment, the area of the second substrate 112 is, for example, less than that of the first substrate 111.

In this embodiment, the first substrate 111 is a thin film transistor (TFT) substrate, and the second substrate 112 is a color filter (CF) substrate, for example. However, in other embodiments, the black matrix layer or filter layer of the color filter substrate also can be removed to the TFT substrate, and thus the first substrate 111 becomes a BOA (BM on array) substrate or COA (color filter on array) substrate. However, the invention is not limited thereto. Besides, the display panel 11 can further include a liquid crystal layer (not shown), which is disposed between the first and second substrates 111 and 112.

The touch panel 12 includes a touch substrate 121, and the second substrate 112 is disposed between the touch substrate 121 and the first substrate 111. Herein, a control IC for controlling the touch panel 12 is not disposed on the touch substrate 121. The display panel 11 has two optical films 113 and 114 for example. Herein, the optical film 113 is a lower polarization plate and the optical film 114 is an upper polarization plate. The optical film 113 is disposed on the side of the first substrate 111 away from the second substrate 112, and the optical film 114 is disposed between the second substrate 112 and the touch panel 12. Herein, the optical film 113 is disposed on the lower surface of the first substrate 111, and the optical film 114 is disposed on the upper surface of the second substrate 112. However, such configuration can be varied in other embodiments. For example, if the display panel 11 is an OLED display panel, only one optical film is required, and it can be, for example but is not limited to, a ¼λ circular polarizer, polarizer or anti-reflection film and is disposed between the second substrate 112 and the touch panel 12.

The area of the optical film 113 is less than that of the first substrate 111, and the area of the optical film 114 is less than that of the second substrate 112. However, in other embodiments, the area of the optical film 113 can be equal to that of the first substrate 111, and the area of the optical film 114 can be equal to that of the second substrate 112.

The touch panel 12 (touch substrate 121) is disposed opposite the display panel 11 and above the second substrate 112, and can be connected to second substrate 112 by adhesion or other connection methods. The touch substrate 121 and the optical film 114 can be connected to each other by an adhesive element (not shown) in a direct bonding way for example. Otherwise, the touch substrate 121 and the optical film 114 don't contact each other, but the touch panel 12 and the display panel 11 are connected to each other in an air bonding way. As to the air bonding, an adhesive element is annularly disposed on the four edges or just a portion of the edges of the upper surface of the second substrate 112, or is disposed in a paste dispensing way, for connecting the touch substrate 121 and the display panel 11. Since the optical film 114 is less than the second substrate 112 in area and is disposed between the second substrate 112 and the touch substrate 121 so as to be surrounded by the adhesive element, a gap is formed between the optical film 114 and the touch substrate 121. Besides, the area of the touch substrate 121 is less than or equal to that of the second substrate 112. In this embodiment, the area of the touch substrate 121 is less than that of the second substrate 112 for example. Besides, in this embodiment, the area of the second substrate 112 is less than that of the first substrate 111.

The first substrate 111 has a first side S1, and the second substrate 112 has a second side S2 that is corresponding to the first side S1. The first side S1 of the first substrate 111 is disposed beyond the second side S2 of the second substrate 112. Besides, the relationship between the other sides of the first substrate 111 and their corresponding sides of the second substrate 112 is not limited in the invention. For example, one of the other sides of the first substrate 111 can go beyond, fail short of, or align with its corresponding side of the second substrate 112.

The first side S1 of the first substrate 111 is disposed beyond the second side S2 of the second substrate 112. A side of the touch panel 12 is disposed beyond the corresponding side of the optical film 114 by a length A between 0 and 10 mm for example. Besides, the first side S1 of the first substrate 111 is disposed beyond the corresponding side of the optical film 114 by a length B, and the length B is not more than 10 mm. The distance C between the touch substrate 121 and the optical film 114 can be between 0 and 0.3 mm. Since the gap (distance C) between the touch substrate 121 and the optical film 114 is extremely small, the deformation of the touch substrate 121 caused by the touch control can be less than the prior art. Besides, the display panel 11 can be thus considered to support the touch substrate 121 at a certain level, and therefore the touch panel 12 is unnecessary to be further treated with a strengthening process.

Figure 2A:
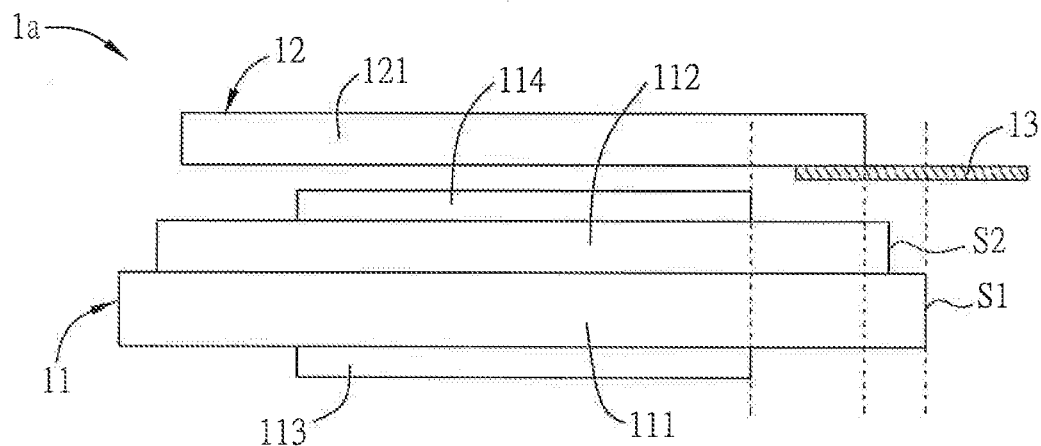
FIGS. 2A and 2B are schematic diagrams of the touch display apparatuses as two variations according to the preferred embodiment of the invention.
Figure 2B:
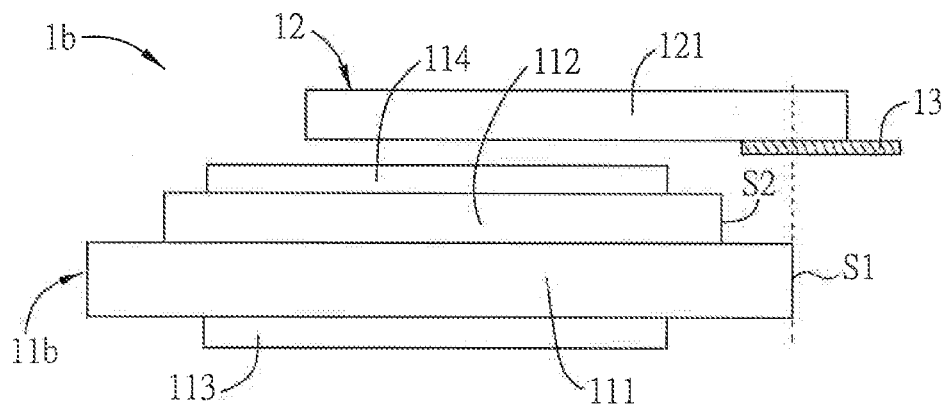

FIGS. 2A and 2B are schematic diagrams of the touch display apparatuses 1a and 1b as two variations according to the preferred embodiment of the invention.

As shown in FIG. 2A, mainly different from the touch display apparatus 1, the touch display apparatus 1a further includes a circuit connection board 13, which is disposed on and bonded to the touch substrate 121 for the mutual electrical connection. Herein, the circuit connection board 13 is connected to the lower surface of the touch substrate 121 to be electrically connected to the touch substrate 121. Besides, at least a portion of the circuit connection board 13 overlaps the first substrate 111. In other words, for a top view of the touch panel 12, at least a portion of the circuit connection board 13 overlaps the first substrate 111. A driving circuit for driving the touch panel 12 is electrically connected to the circuit connection board 13 so as to control the touch panel 12 through the circuit connection board 13. Herein, the circuit connection board 13 is, for example but not limited to, a flexible printed circuit (FPC) board or rigid-flex board.

Besides, at least a portion of the circuit connection board 13 overlaps the second substrate 112. In this embodiment, the circuit connection board 13 overlaps both of the first and second substrates 111 and 112. Furthermore, the circuit connection board 13 doesn't overlap the optical film 114. Therefore, the gap between the touch substrate 121 and the second substrate 112 can be kept smaller. Because the circuit connection board 13 doesn't overlap the optical film 114 but overlaps the first substrate 111, the connection area between the touch substrate 121 and the circuit connection board 13 can be increased and thus the total dimensions thereof can be reduced.

As shown in FIG. 2B, mainly different from the touch display apparatus 1a, for a top view of the touch display apparatus 1b, the circuit connection board 13 just overlaps the first substrate 111 but has no overlap with the second substrate 112.

Figure 3A:
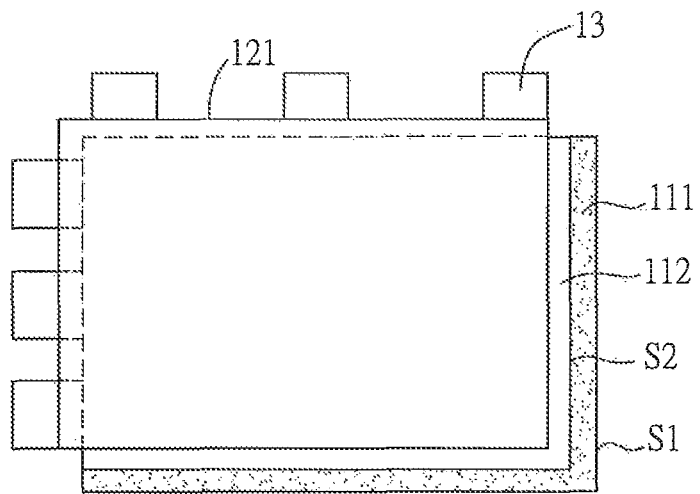
FIGS. 3A to 3C are schematic diagrams showing some variations of the relative position of the touch substrate, first substrate and second substrate according to this invention.
Figure 3B:
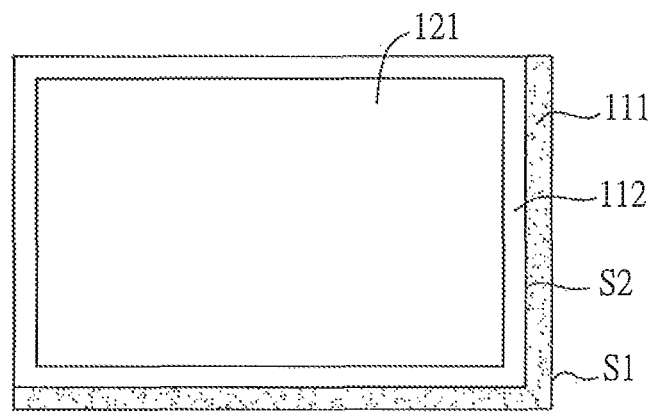
Figure 3C:
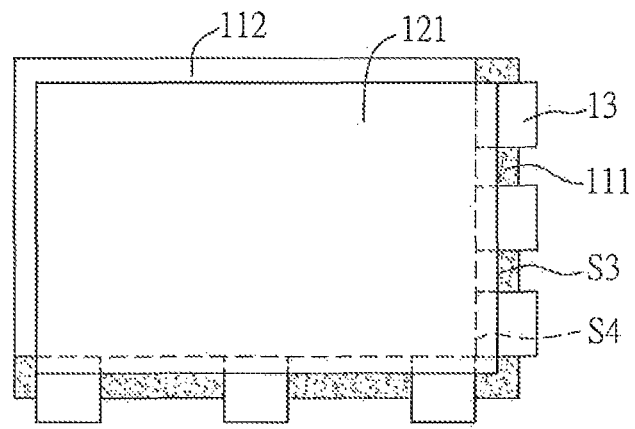

FIGS. 3A to 3C are schematic diagrams showing some variations of the relative position of the touch substrate 121, first substrate 111 and second substrate 112 according to this invention.

As shown in FIG. 3A, the touch substrate 121 is disposed over the display panel (including the first and second substrates 111 and 112), and is disposed beyond at least an edge of the display panel. Herein, the area of the second substrate 112 is less than that of the first substrate 111. The four sides of the touch substrate 121 are not aligned with those of the first substrate ill, respectively. The two sides (left and top sides) of the second substrate 112 are aligned with the corresponding sides of the first substrate 111, respectively. In this embodiment, the circuit connection board 13 is located at the left and top sides of the touch substrate 121 in FIG. 3A. Otherwise, the circuit connection board 13 can be disposed at the right and bottom sides of the touch substrate 121 of FIG. 3A. At least one of the sides of the second substrate 112 is disposed between the first substrate 111 and the touch substrate 121. Herein for example, the two sides (right and bottom sides) of the second substrate 112 are located between the corresponding sides of the first substrate 111 and the touch substrate 121, respectively. Besides, the first side S1 of the first substrate 111 is disposed beyond the corresponding side (second side S2) of the second substrate 112.

As shown in FIG. 3B, the touch substrate 121 is disposed over the display panel (including the first and second substrates 111 and 112). The four sides of the touch substrate 121 are not aligned with those of the first and second substrates 111 and 112, respectively. The two sides (left and top sides) of the second substrate 112 are aligned with the corresponding sides of the first substrate 111, respectively. The area of the second substrate 112 is less than that of the first substrate 111.

As shown in FIG. 3C, the touch substrate 121 is disposed over the display panel (including the first and second substrates 111 and 112), and is disposed beyond the display panel. The four sides of the touch substrate 121 are not aligned with those of the first and second substrates 111 and 112, respectively. The two sides (left and top sides) of the second substrate 112 are aligned with the corresponding sides of the first substrate 111, respectively. Besides, the second substrate 112 has a fourth side S4 that is corresponding to a third side S3 of the touch substrate 121, and the third side S3 of the touch substrate 121 is disposed beyond the fourth side S4 of the second substrate 112. The area of the second substrate 112 is less than that of the first substrate 111. The circuit connection board 13 is disposed at the third and bottom sides of the touch substrate 121 in FIG. 3C.

Figure 4A:
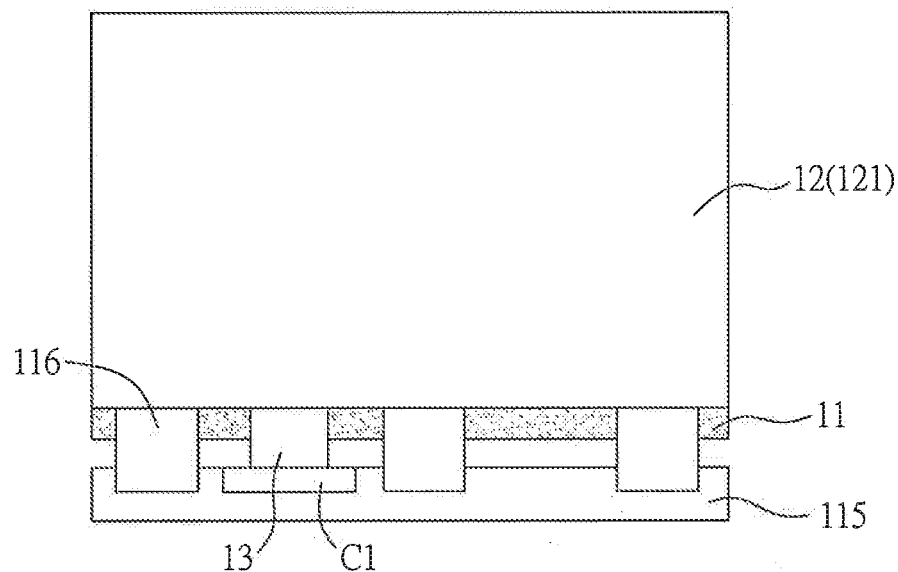
FIG. 4A is a schematic diagram showing the integration of the driving circuit of the touch panel and the driving circuit of the display panel according to this invention.

FIG. 4A is a schematic diagram showing the integration of the driving circuit of the touch panel 12 and the driving circuit of the display panel 11 according to this invention.

The display panel 11 can be electrically connected to a driving circuit board 115 through a circuit film 116 (e.g. chip on film, COF), and the touch panel 12 (touch substrate 121) can be electrically connected to the driving circuit board 115 through the circuit connection board 13 and a connection element C1. Therefore, the driving circuits of the display panel 11 and touch panel 12 can be integrated to the same driving circuit board 115.

Figure 4B:
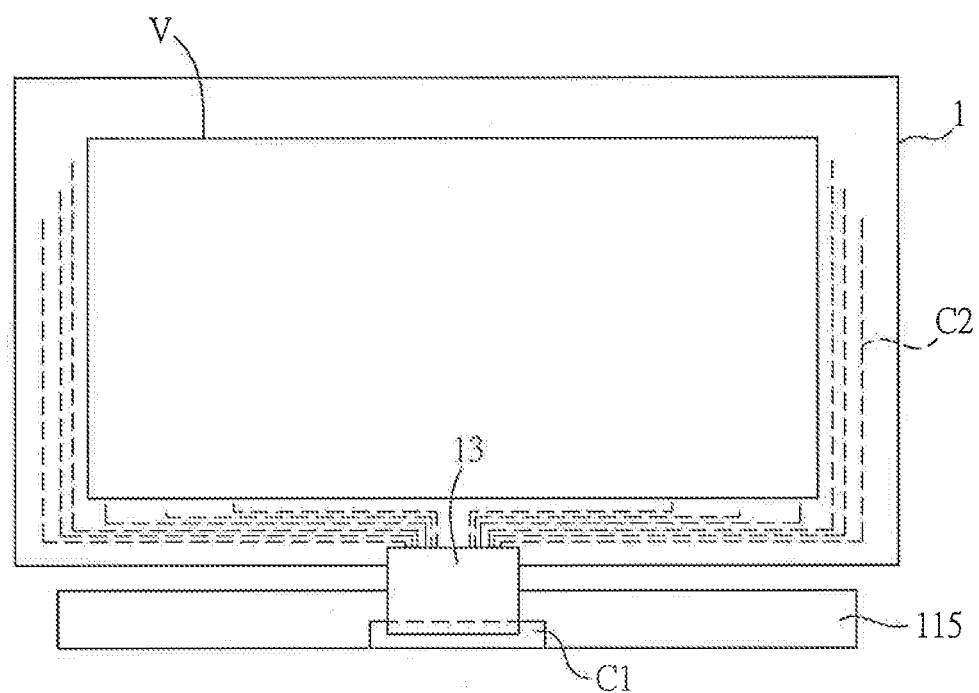
FIGS. 4B to 4D are schematic diagrams of some variations of the layout of the touch display apparatus according to this invention.
Figure 4C:
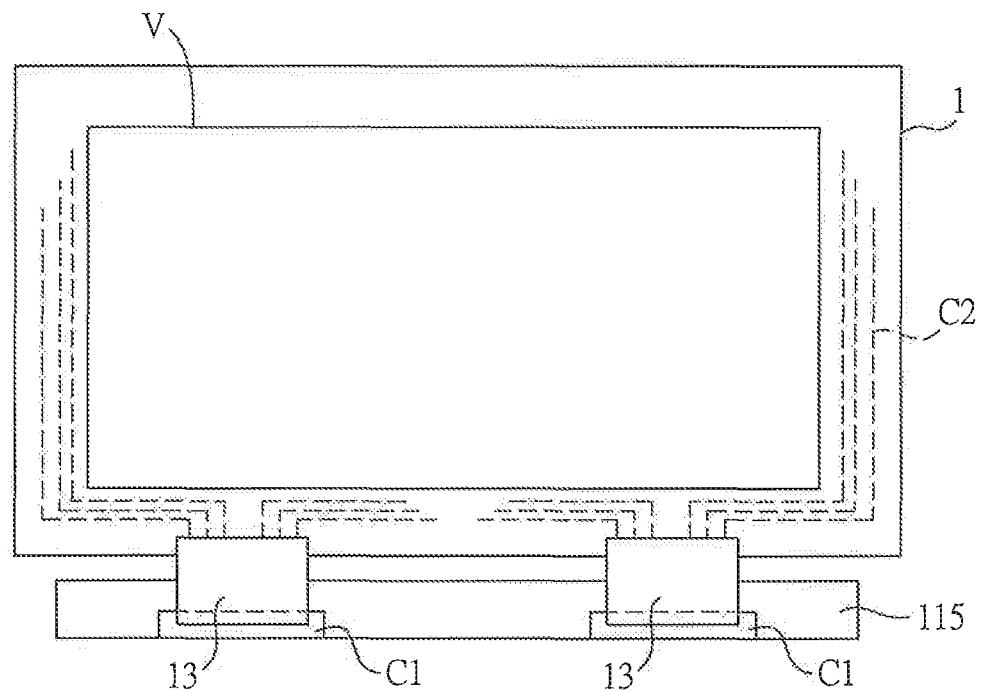
Figure 4D:
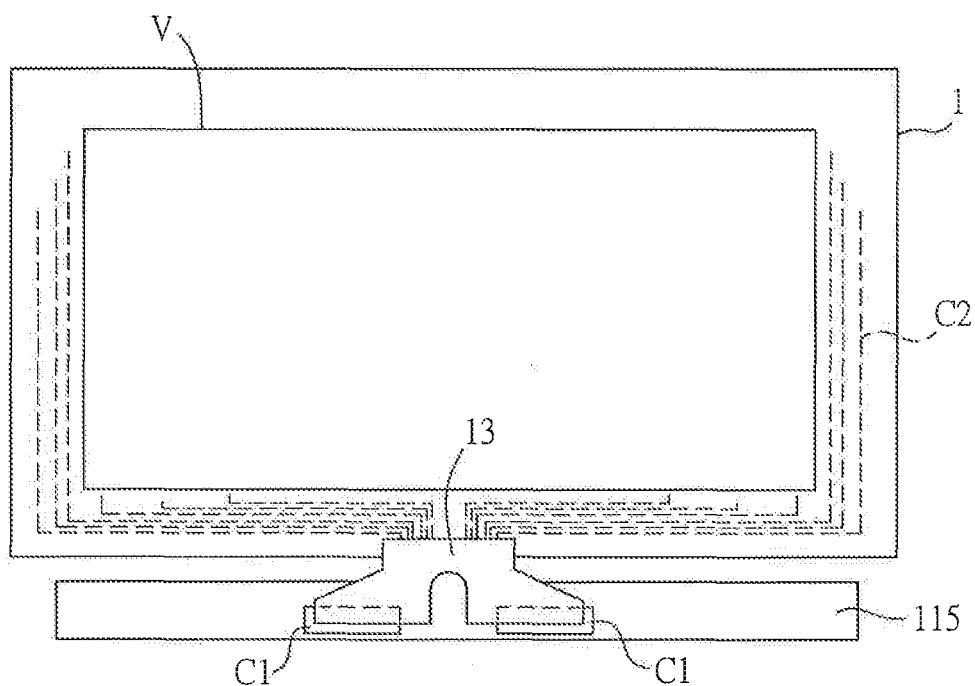

FIGS. 4B to 4D are schematic diagrams of some variations of the layout of the touch display apparatus 1 according to this invention. Herein, the touch display apparatus 1 is taken as an example, but the touch display apparatuses 1a and 1b also can be applied in this manner.

The touch display apparatus 1 has a viewable area V. The viewable area V denotes the area which the light can pass through to cause images for the user. Herein, the driving circuits of the display panel 11 (not shown) and touch panel 12 (not shown) of the touch display apparatus 1 are integrated to the same driving circuit board 115.

As shown in FIG. 4B, the driving circuit board 115 is electrically connected to the touch display apparatus 1 through a connection element C1, a circuit connection board 13 and a plurality of wires C2. As shown in FIG. 4C, the driving circuit board. 115 is electrically connected to the touch display apparatus 1 through two connection elements C1, two circuit connection boards 13 and a plurality of wires C2. As shown in FIG. 4D, the driving circuit board 115 is electrically connected to the touch display apparatus 1 through two connection elements C1, a circuit connection board 13 and a plurality of wires C2.

Figure 5:
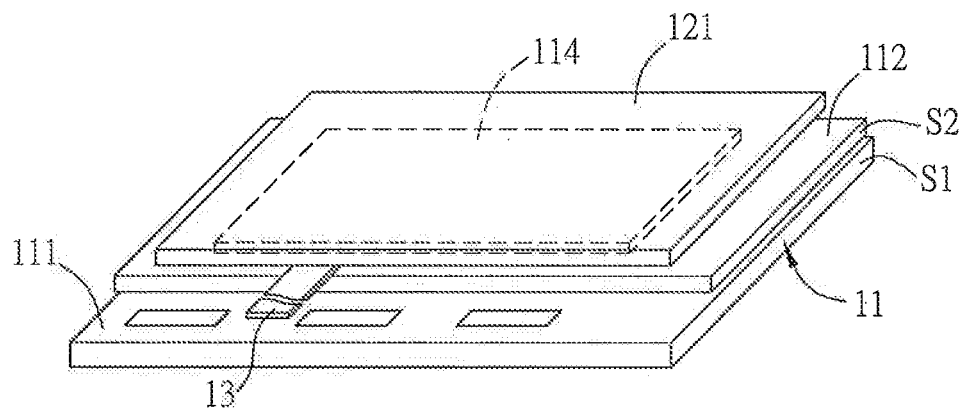
FIG. 5 is a schematic perspective diagram of a touch display apparatus according to a preferred embodiment of the invention.

FIG. 5 is a schematic perspective diagram of a touch display apparatus according to a preferred embodiment of the invention. The optical film 113 is not shown in FIG. 5.

The touch substrate 121 overlaps the display panel 11. The first substrate 111 is located at a lower place, and the second substrate 112 is disposed above the first substrate 111. The first side S1 of the first substrate 111 is disposed beyond the second side S2 of the second substrate 112. The area of the second substrate 112 is less than that of the first substrate 111. The area of the touch substrate 121 is less than that of the second substrate 112. Between the touch substrate 121 and the second substrate 112 is the optical film 114, and the area of the optical film 114 is less than that of each of the touch substrate 121 and the second substrate 112. The circuit connection board 13 is connected to the touch substrate 121, and overlaps the first and second substrates 111 and 112 for a top view.

Figure 6:
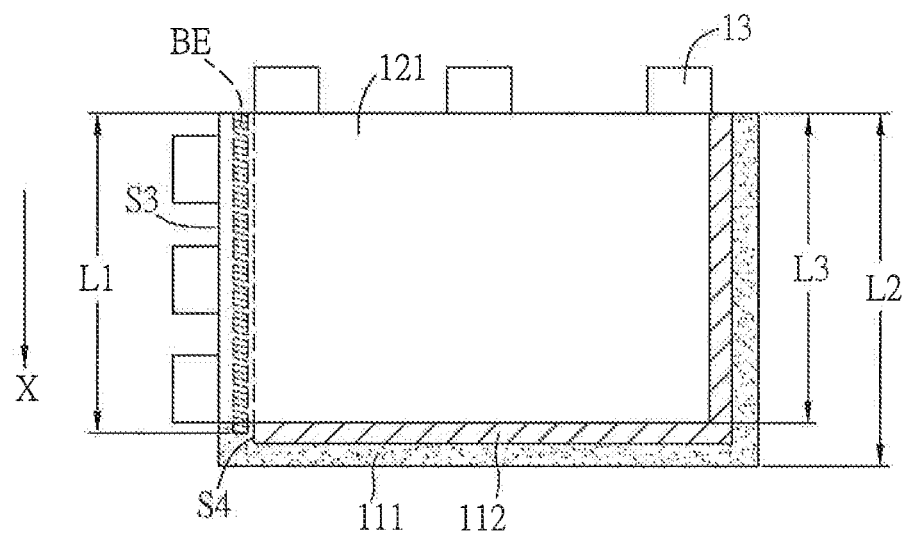
FIG. 6 is a schematic diagram showing another relative position of the touch substrate, first substrate and second substrate according to this invention.

FIG. 6 is a schematic diagram showing another relative position of the touch substrate 121, first substrate 111 and second substrate 112 according to this invention.

In this embodiment, the third side S3 (left side) is disposed beyond the corresponding side (fourth side S4) of the second substrate 112. The touch display apparatus further includes a buffer element BE, which is disposed between the touch substrate 121 and the first substrate 111 and is adjacent to the third side S3 and fourth side S4. Therefore, the buffer element BE can provide a buffer between the first substrate 111 and the touch substrate 121. The buffer element BE has a lengthwise direction X. Along the lengthwise direction X, the buffer element BE has a first length L1, the first substrate 111 has a second length L2, and the touch substrate 121 has a third length L3. The first length L1 is less than or equal to the second length L2, and is larger than or equal to the third length L3. Herein, the third length L3 is less than the first length L1 while the first length L1 is less than the second length L2.

FIGS. 7A to 7K are perspective sectional diagrams schematically showing several variations of a touch display apparatus according to a preferred embodiment of the invention. The circuit connection board 13 is directly connected to the touch substrate 121 to achieve the mutual electrical connection. Besides, the circuit connection board 13 can be electrically connected to the driving circuit board of the touch substrate 121 via the through hole of the adhesive element or plastic frame. The circuit connection board 13 is disposed over the first substrate 111, and that means at least a portion of the circuit connection board 13 overlaps the display panel 11. However, the circuit connection board 13 is not shown in FIGS. 7A to 7K. Besides, FIGS. 7B to 7G, and 7J to 7K show the cases of the touch substrate 121 disposed beyond at least an edge of the display panel 11.

Figure 7A:
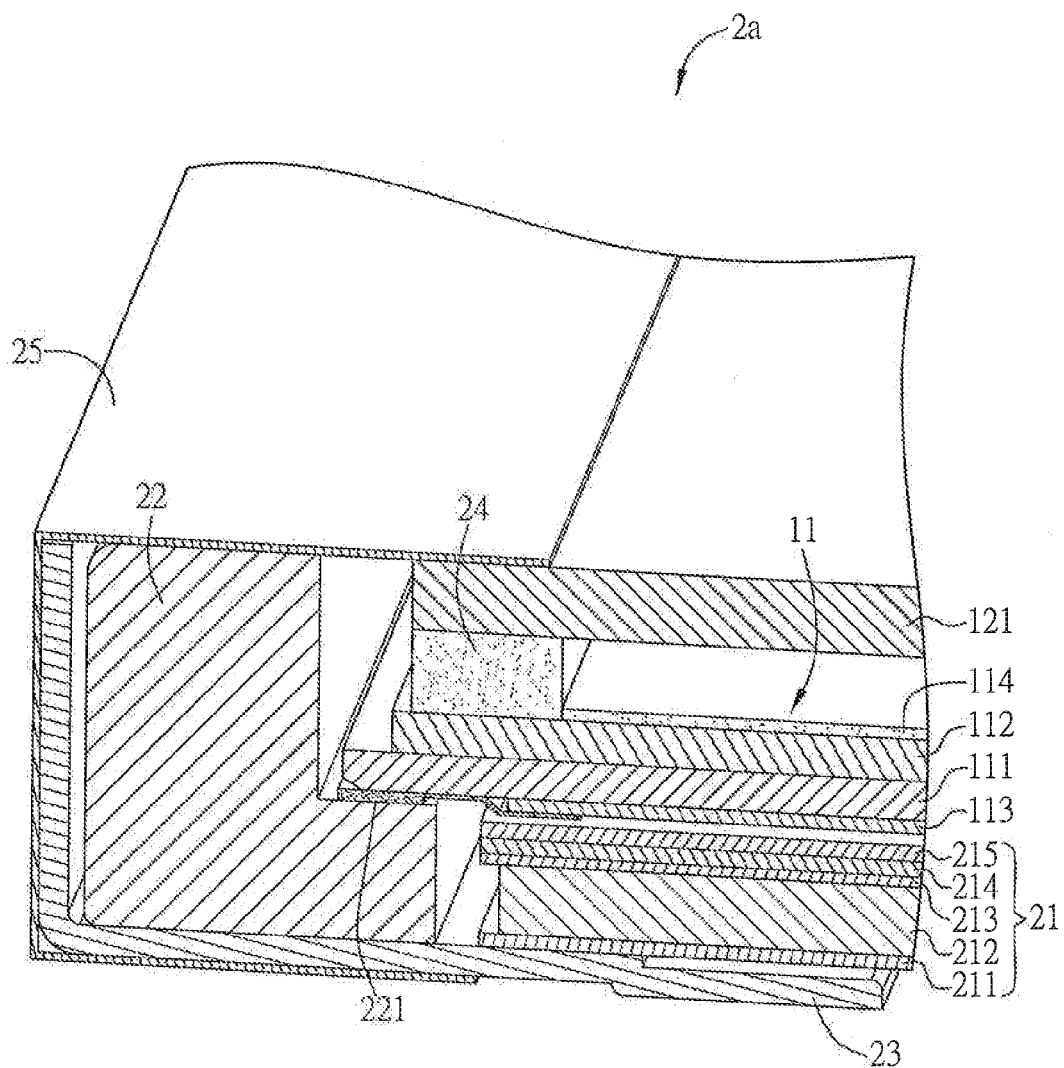
FIGS. 7A to 7K are perspective sectional diagrams schematically showing several variations of a touch display apparatus according to a preferred embodiment of the invention.

As shown in FIG. 7A, the touch display apparatus 2a includes a touch panel 11, a display panel 12 and a backlight module 21. The touch panel 11 and display panel 12 are clearly illustrated in the above embodiments, and therefore they are not described here for conciseness.

The backlight module 21 is disposed on the side of the display panel 11 away from the touch substrate 121, and can emit the light to the display panel 11 so that the display panel 11 can display images. In this embodiment, the backlight module 21 includes a reflective plate 211, alight guiding plate 212 and a plurality of optical films 213, 214, 215. The optical films 213 to 215 are, for example but not limited to, a light concentrating plate or diffusion plate each. Since the backlight module 21 belongs to the prior art and can be known by those skilled in the art, it is not described here for conciseness.

The touch display apparatus 2a further includes a plastic frame 22 and a back plate 23. The display panel 11 is disposed to the plastic frame 22. The plastic frame 22 can support the display panel 11, and thus the display panel 11 is disposed opposite the backlight module 21. Herein, the plastic frame 22 is adjacent to the backlight module 21. The display panel 11 and the touch substrate 121 are disposed on the plastic frame 22, so that the first substrate 111, second substrate 112 and touch substrate 121 are supported by a supporting surface 1 of the plastic frame 22. Besides, the back plate 23 can accommodate the display panel 11, touch substrate backlight module 21 and plastic frame 22, and can provide protection for the collision, electromagnetic wave or electric shock. The back plate 23 can be made by plastic material, metal or alloy, but this invention is not limited thereto.

In this embodiment, the area of the touch substrate 121 is less than that of the second substrate 112, and the first substrate 111 is disposed beyond at least an edge of the second substrate 112. In other embodiments, the area of the touch substrate 121 can be equal to that of the second substrate 112. The touch substrate 121 and the display panel 11 are connected to each other by air bonding. Herein, the touch display apparatus 2a further includes an adhesive element 24, which is disposed on the edge of the upper surface of the second substrate 112 to adhere to the touch substrate 121 and second substrate 112. The adhesive element 24 can be disposed annularly or in a paste dispensing way. In a paste dispensing way can reduce the cost, and the annular disposition can provide a better connection effectiveness. The optical film 114 is less than the second substrate 112 in area, and is surrounded by the adhesive element 24. A gap is kept between the optical film 114 and the touch substrate 121. In other embodiments, an optical film (not shown) can be disposed within the gap for increasing the light output efficiency of the touch display apparatus 2a.

The touch display apparatus 2a can further include a light blocking element 25. The light blocking element 25 is, for example but not limited to, a light blocking adhesive tape, and extends from the back plate 23 to the edge of the touch substrate 121 for blocking the undesired side light and providing a fixing function. Herein, the light blocking element 25 adheres to the back plate 23 and covers the partial touch substrate 121, the plastic frame 22, and an edge and partial bottom of the back plate 23.

Figure 7B:
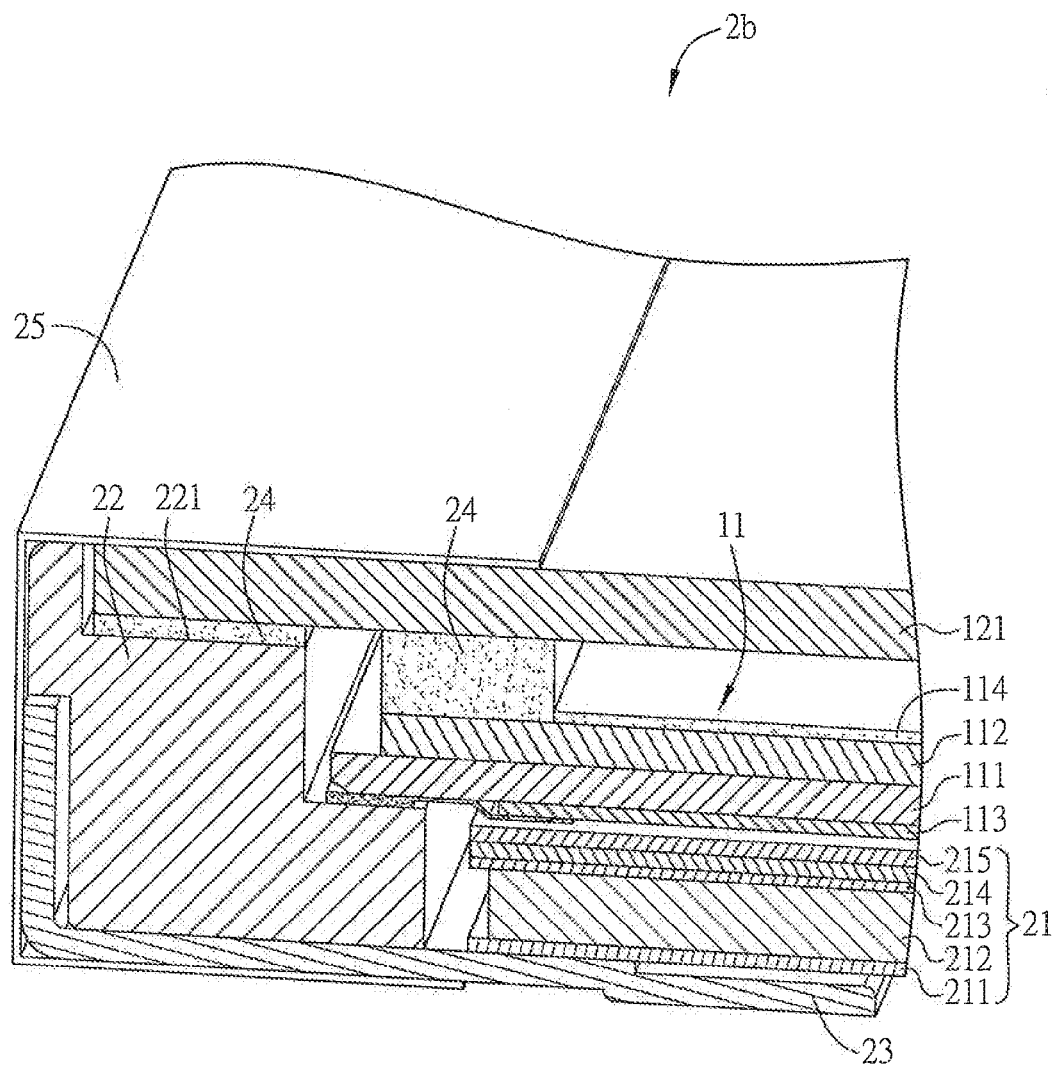

As shown in FIG. 7B, mainly different from the touch display apparatus 2a, the touch substrate 121 of the touch display apparatus 2b is disposed beyond an edge of the display panel 11, and the shape of the plastic frame 22 is changed accordingly to limit the lateral movements of the touch substrate 121 and display panel 11. Besides, another adhesive element 24 is disposed between the plastic frame 22 and the touch substrate 121 and adheres to the supporting surface 221 of the plastic frame 22 for fixing the touch substrate 121.

Figure 7C:
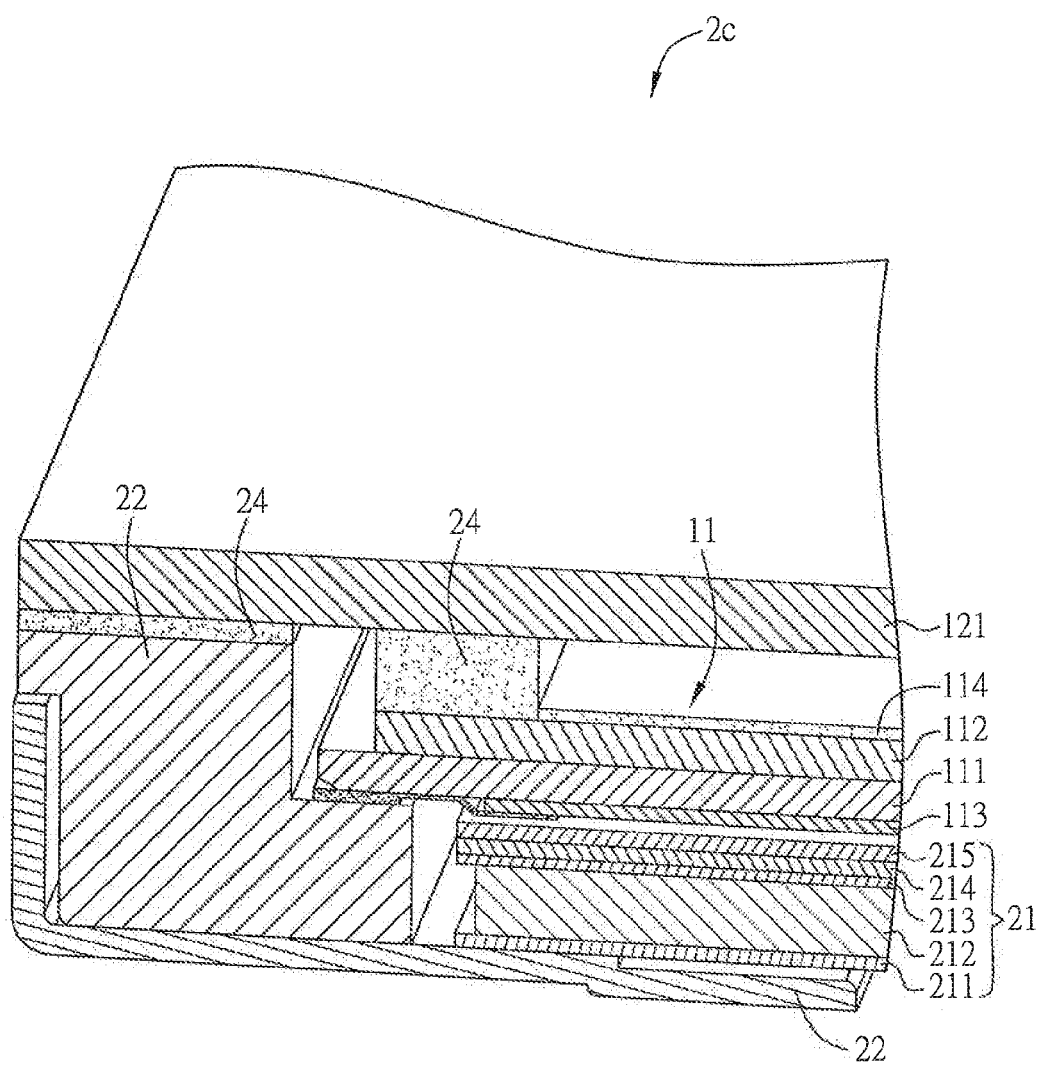

As shown in FIG. 7C, mainly different from the touch display apparatus 2b in FIG. 7B, the touch display apparatus 2c doesn't include the light blocking element 25 of FIG. 7B. Besides, the plastic frame 22 of the touch display apparatus 2c is slightly different from that of FIG. 7B in shape.

Figure 7D:
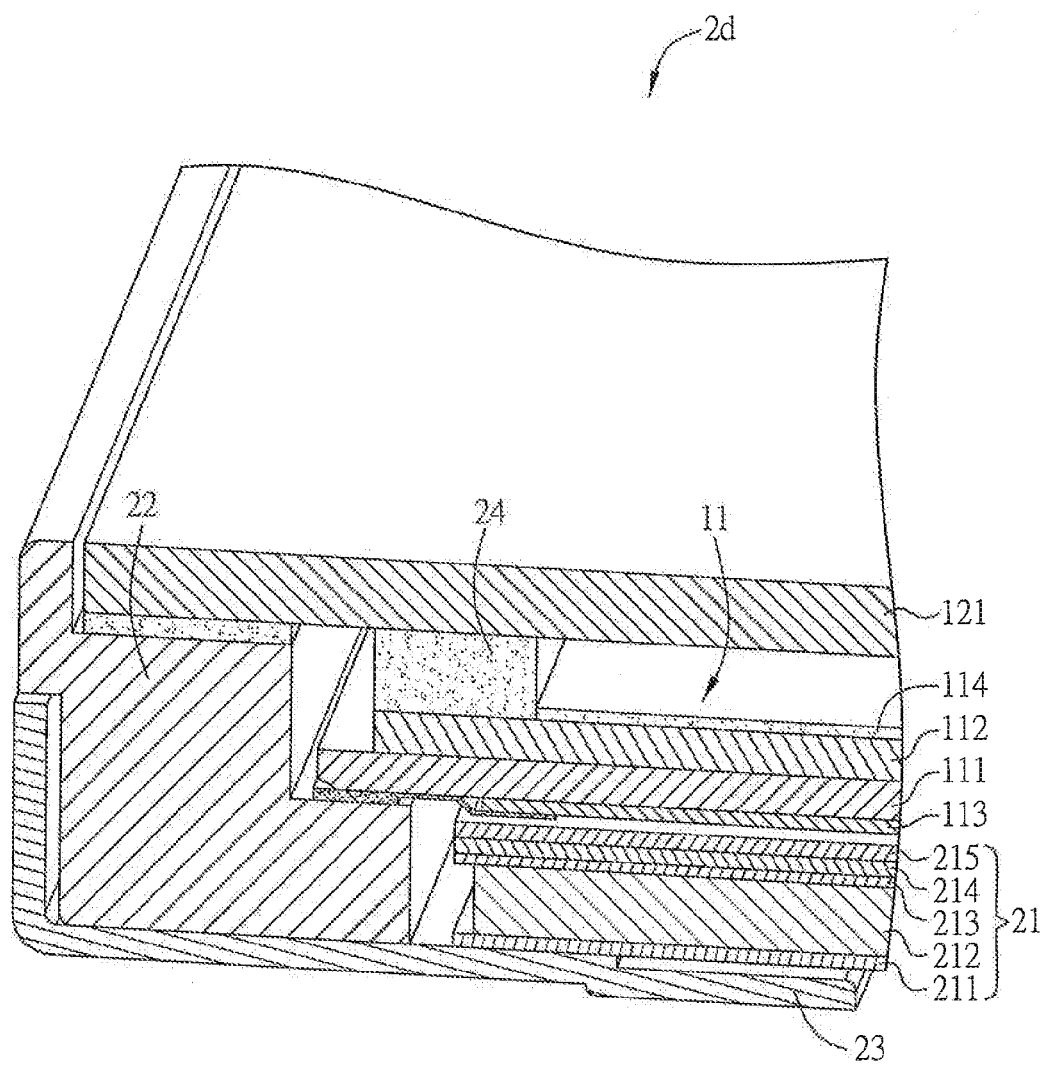

As shown in FIG. 7D, mainly different from the touch display apparatus 2b in FIG. 7B, the touch display apparatus 2c doesn't include the light blocking element 25 of FIG. 7B.

Figure 7E:
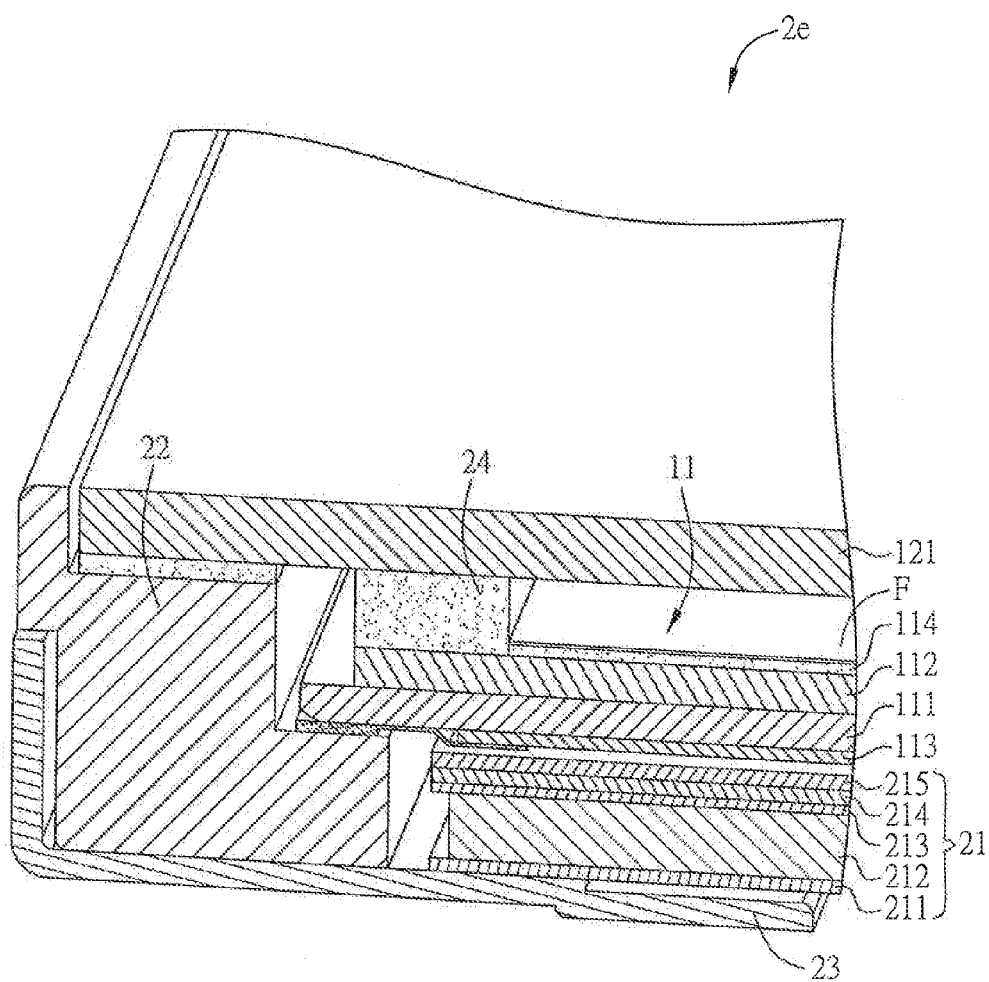

As shown in FIG. 7E, mainly different from the touch display apparatus 2d in FIG. 7D, the touch display apparatus 2e further includes an optical film F. The optical film F is disposed between the second substrate 112 and the touch substrate 121 and connected to the optical film 114 for reflecting and returning the light to the touch substrate 121 in order to increase the light output efficiency. The optical film F is made by the material with high reflectance, and can be an anti-reflection film for example.

Figure 7F:
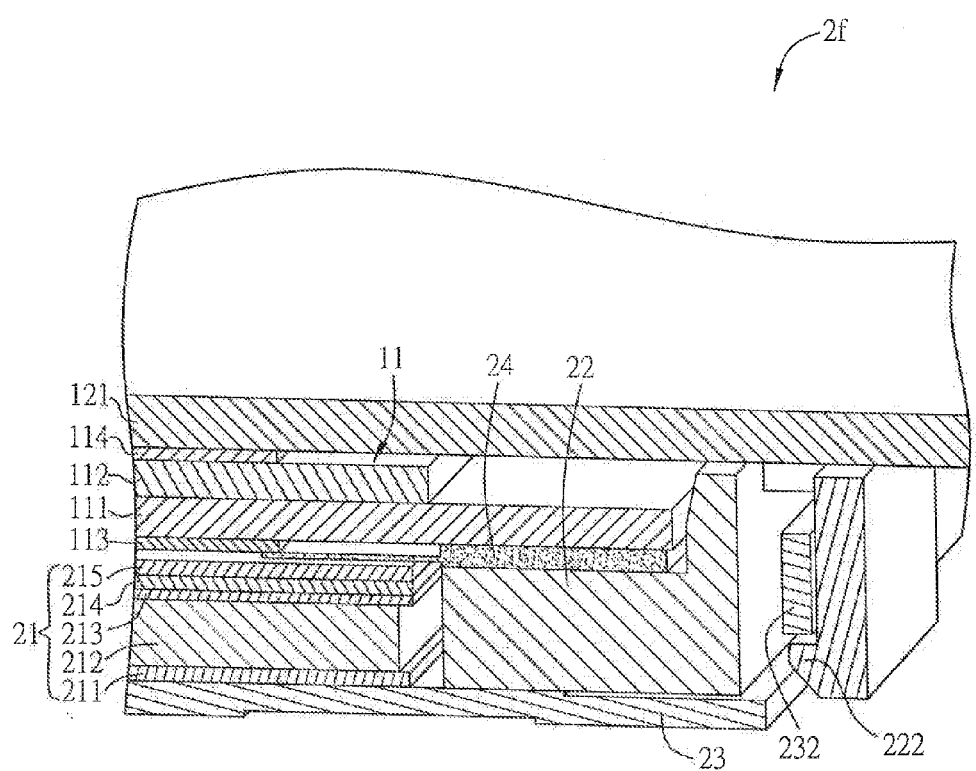

As shown in FIG. 7F, mainly different from the touch display apparatus 2c in FIG. 7C, the touch substrate 121 and the display panel 11 of the touch display apparatus 2f are connected to each other by a direct bonding (the adhesive element therebetween is not shown). The area of the second substrate 112 is less than that of the first substrate 111, and the area of the touch substrate 121 is less that that of the second substrate 112. Besides, the touch substrate 121 is disposed beyond the edges of the first and second substrates 111 and 112. The plastic frame 22 in FIG. 7F has a hook portion 222, and the hook portion 222 and a locking portion 232 of the back plate 23 are locked by each other.

Figure 7G:
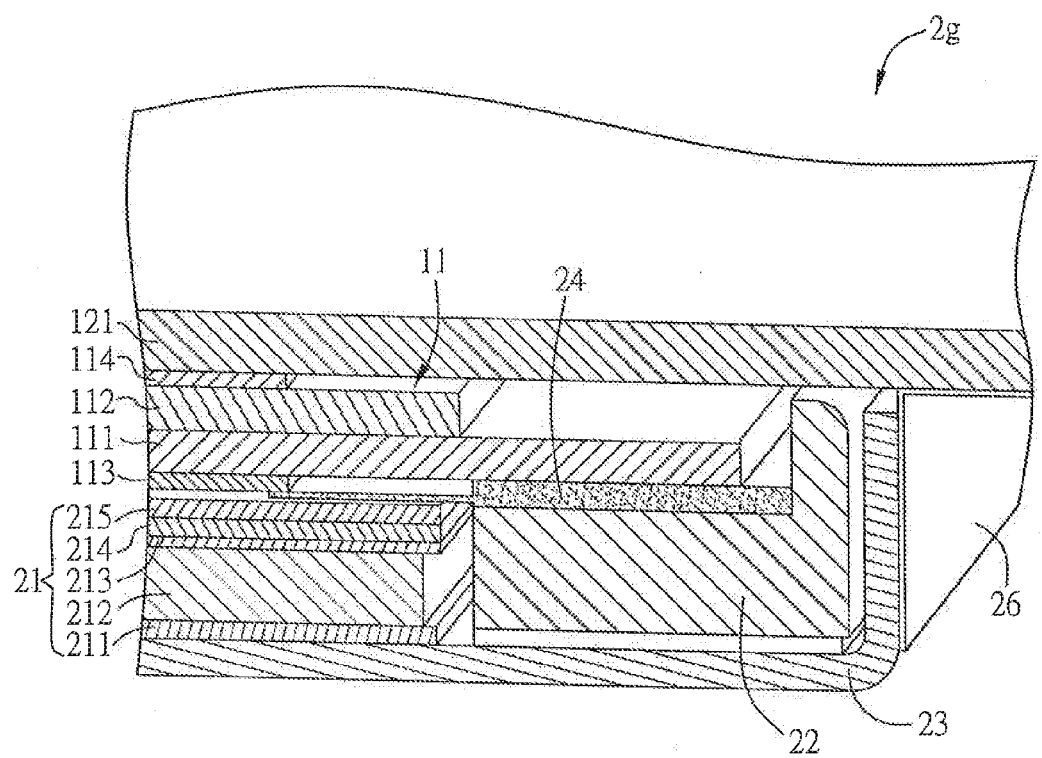

As shown in FIG. 7G, mainly different from the touch display apparatus 2f in FIG. 7F, the plastic frame 22 of the touch display apparatus 2g in FIG. 7G has no hook portion, and the back plate 23 and the touch substrate 121 are fixed together by an adhesive tape 26.

In comparison with the cases of FIGS. 7A to 7G, the cases of FIGS. 7H to 7K are designed as no plastic frame, and the adhesive element 24 adheres to, supports or connects to the display panel and the touch substrate 121.

Figure 7H:
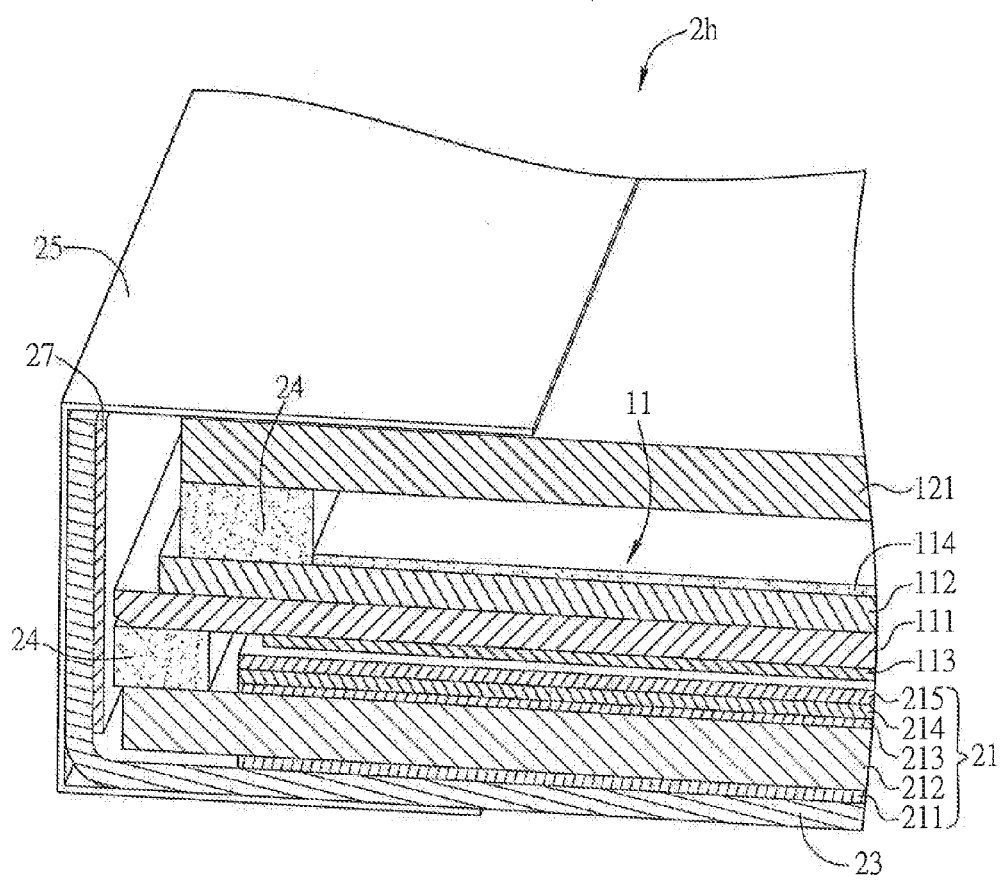

As shown in FIG. 7H, the touch substrate 121 and display panel 11 of the touch display apparatus 2h are connected to each other by an air bonding, and thus the adhesive element 24 connects to the touch substrate 121 and the display panel 11. The area of the touch substrate 121 is less than that of the second substrate 112, and the area of the second substrate 112 is less than that of the first substrate 111. In other embodiments, the area of the touch substrate 121 can be equal to that of the second substrate 112, and the area of the second substrate 112 can be equal to that of the first substrate 111. Besides, another adhesive, element 24 is disposed between the display panel 11 and the light guiding plate 212 of the backlight module 21, and adheres to and supports them. Furthermore, a buffer pad 27 is disposed among the back plate 23, backlight module 21, display panel 11 and touch substrate 121, and can absorb the vibration and installation tolerance of the backlight module 21, display panel 11 and touch substrate 121 disposed to the back plate 23. Because this embodiment is designed as no plastic frame, the touch substrate 121, display panel 11 and backlight module 21 are connected and fixed by the adhesive element 24.

Figure 7I:
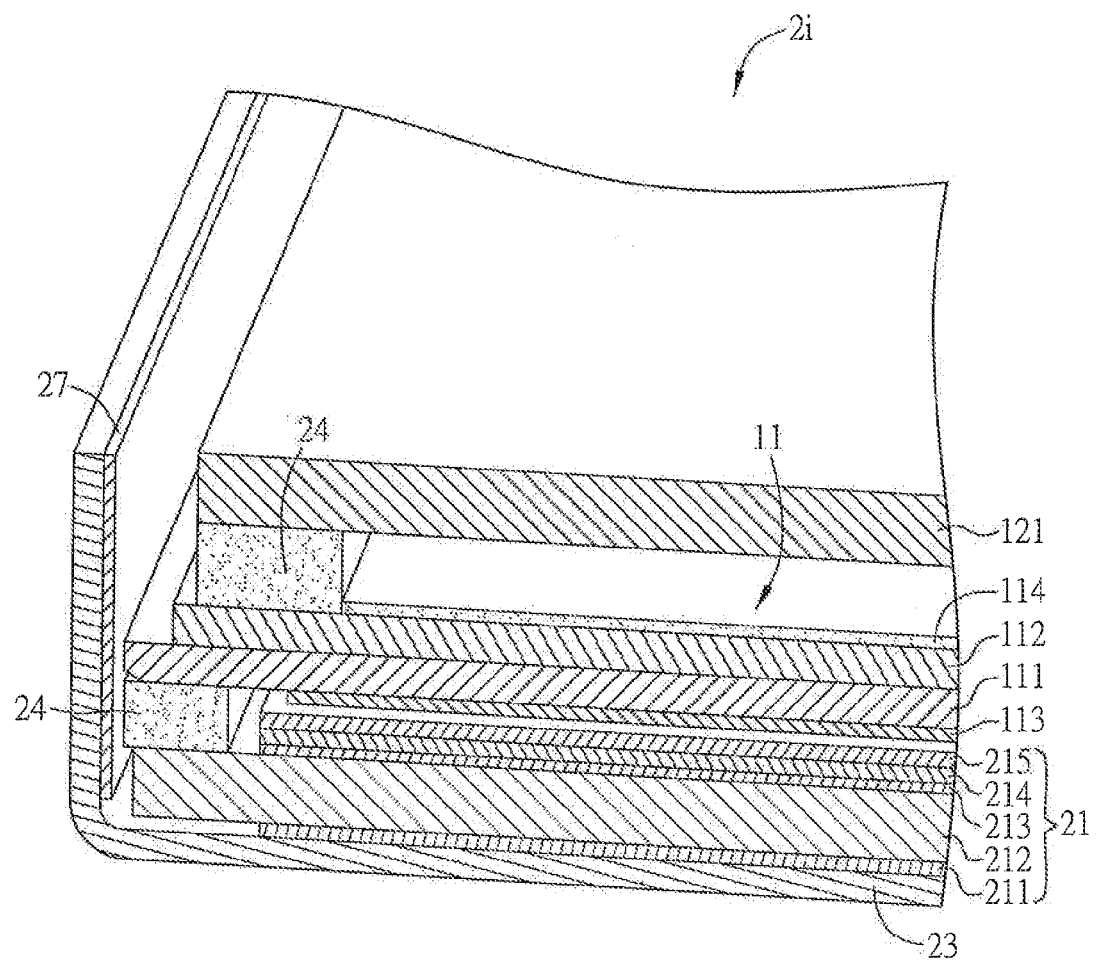

As shown in FIG. 7I, mainly different from the touch display apparatus 2h in FIG. 7H, the touch display apparatus 2i has no light blocking element 25 of FIG. 7H.

Figure 7J:
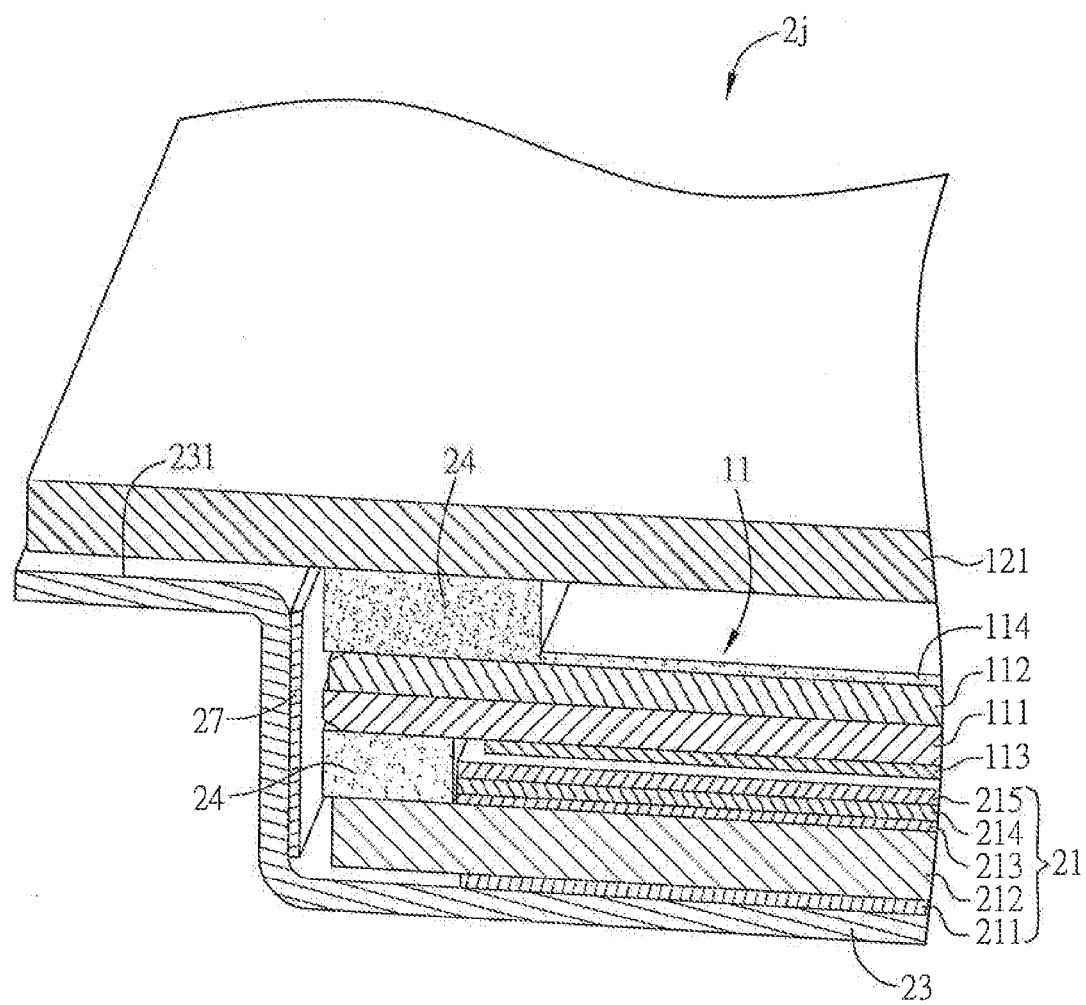

In FIG. 7J, a side of the substrate 111 aligned with its corresponding side of the second substrate 112 is shown, and another side of the substrate 111 disposed beyond its corresponding side of the second substrate 112 is not shown.

Mainly different from the touch display apparatus 2i in FIG. 7I, the touch substrate 121 of the touch display apparatus 2j is disposed beyond the edges of the first and second substrates 111 and 112, and the back plate 23 is changed accordingly in shape. Thus, the touch substrate 121 is supported by a supporting surface 231 of the back plate 23.

Figure 7K:
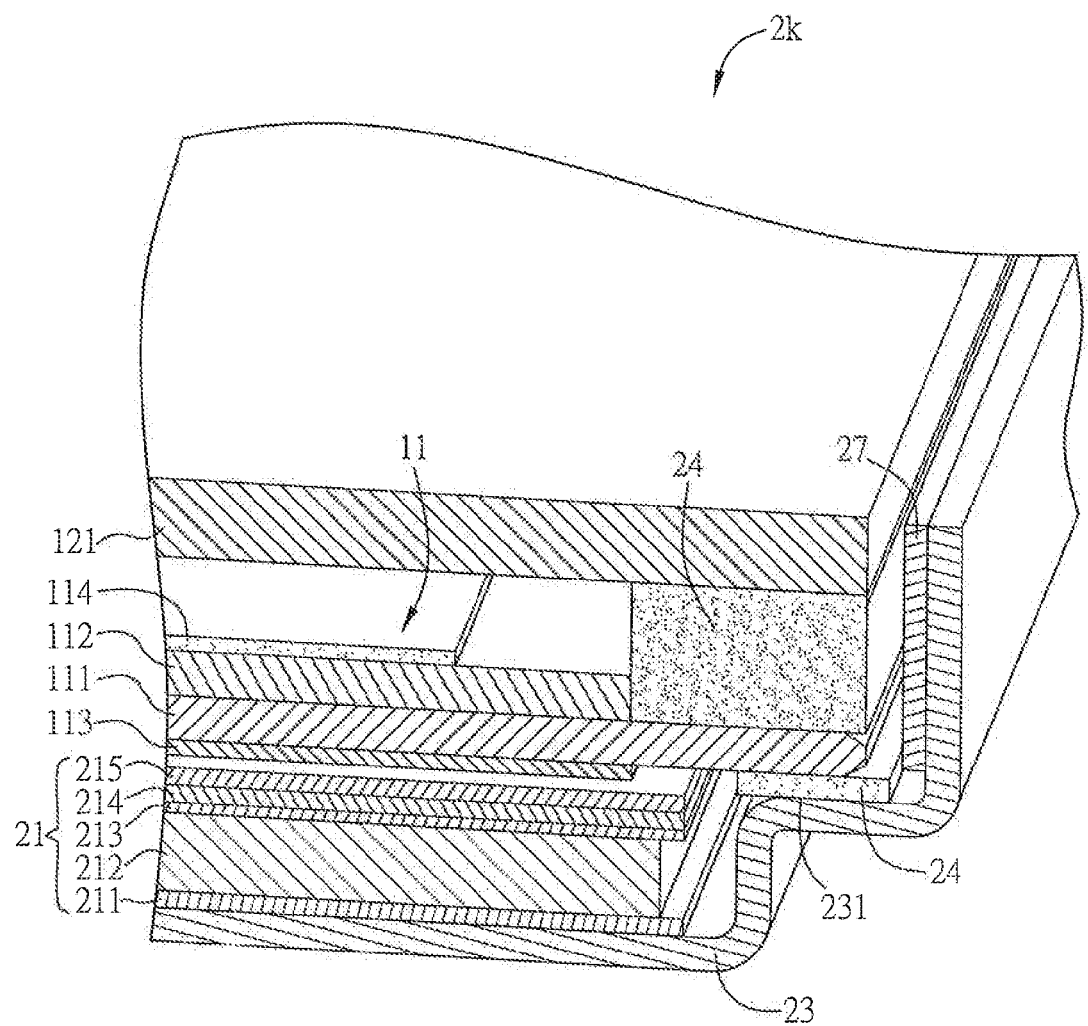

As shown in FIG. 7K, mainly different from the touch display apparatus 2j in FIG. 7J, the shape of the back plate 23 of the touch display apparatus 2k is changed according to the position of the first substrate 111 and touch substrate 121, and thus the back plate 23 supports and adheres to the first substrate 111 by the supporting surface 231 and another adhesive element 24.

Figure 8:
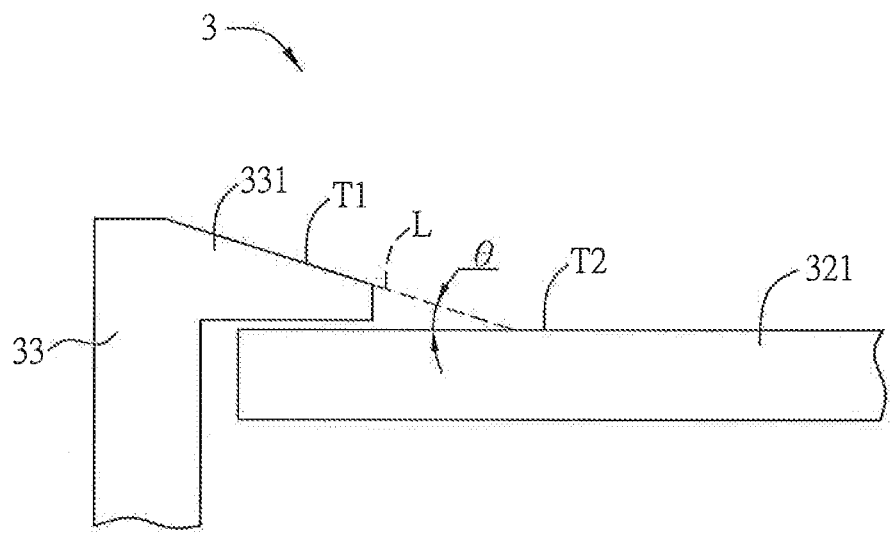
FIG. 8 is a schematic diagram of another ouch display apparatus according to a preferred embodiment of the invention.

FIG. 8 is a schematic diagram of another touch display apparatus 3 according to a preferred embodiment of the invention. As shown in FIG. 8, the touch display apparatus 3 can be one of the touch display apparatuses 2a~2k. Except the touch substrate 321, other components of the touch display apparatus in the above-mentioned embodiments are not shown in FIG. 8.

The touch display apparatus 3 can further include a front frame 33, which is disposed at the edge of the touch substrate 321 but uncovers the viewable area. Herein, the front frame 33 includes a blocking portion 331, which is disposed above the touch substrate 321 and covers an outer edge of the touch substrate 321. The blocking portion 331 has a surface T1, and an angle θ is formed between an extension L of the surface T1 and an upper surface T2 of the touch substrate 321. The angle θ can be between 5° and 30°.

FIGS. 9A to 9D are schematic diagrams of the touch display apparatuses 4a~4d as four variations according to a preferred embodiment of the invention. In FIGS. 9A to 9D, a side of the touch substrate 121 aligned with the corresponding sides of the first and second substrates 111 and 112 is shown, and the first side of the substrate 111 disposed beyond the second side of the second substrate 112 is not shown.

Figure 9A:
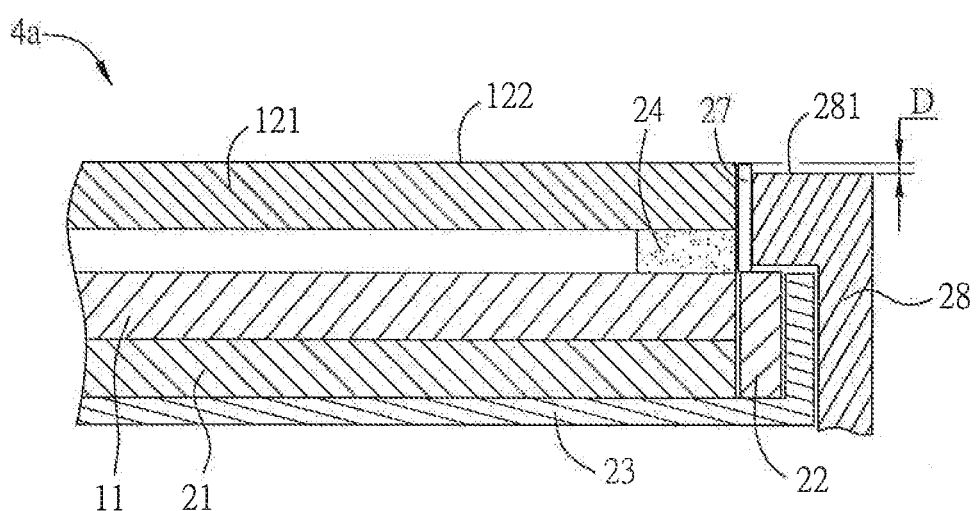
FIGS. 9A to 9D are schematic diagrams of the touch display apparatuses as four variations according to a preferred embodiment of the invention.

As shown in FIG. 9A, the touch substrate 121 and the display panel 11 are connected to each other by an air bonding (via the adhesive element 24). Besides, the touch substrate 121, display panel 11 and backlight module 21 are disposed inside the back plate 23.

The touch display apparatus 4a further includes an appearance element 28, which is disposed around the touch substrate 121, display panel 11 and backlight module 21. Herein, in consideration of the touch substrate 121, display panel 11 and backlight module 21, this case is a so-called borderless design. A top surface 281 of the appearance element 28 can be lower than, as high as, or higher than a surface 122 of the touch substrate 121. Herein, the surface 122 is the upper surface and can be regarded as a touch surface. In other words, the top surface 281 of the appearance element 28 and the surface 122 of the touch substrate 121 can have no height difference or a height difference D that is between 0 and 1 mm and preferably between 0 and 0.5 mm. In this embodiment, the top surface 281 of the appearance element 28 is lower than the surface 122 of the touch substrate 121 by a height difference D of 1 mm at most. In other embodiments, if the top surface 281 of the appearance element 28 is higher than the surface 122 of the touch substrate 121, the height difference D is also 1 mm at most.

Figure 9B:
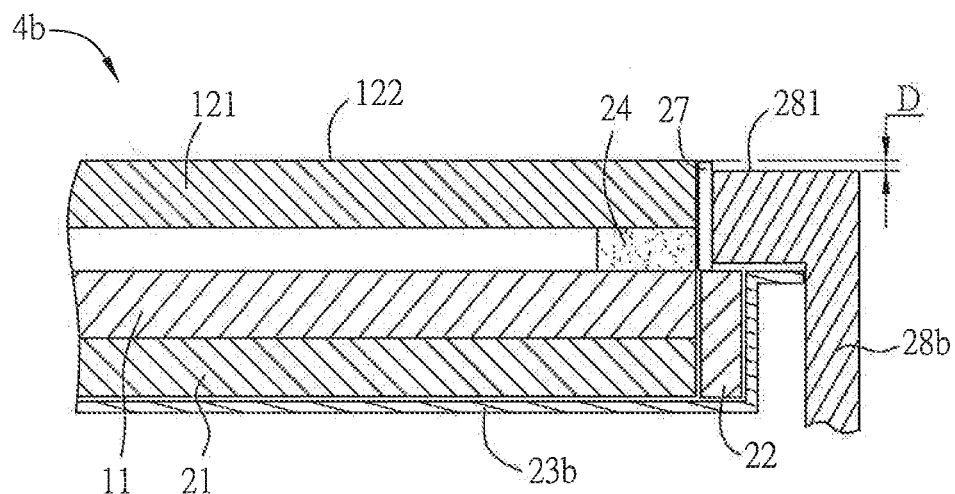

As shown in FIG. 9B, mainly different from the touch display apparatus 4a, the back plate 23b of the touch display apparatus 4b has a different shape from the back plate 23, and accordingly the shape of the appearance element 28b is different from the appearance element 28. However, the height difference D between the top surface 281 of the appearance element 28b and the surface 122 of the touch substrate 121 is still between 0 and 1 mm. Other technical features of the touch display apparatus 4b can be known by referring to the touch display apparatus 4a, and therefore they are not described here for conciseness.

Figure 9C:
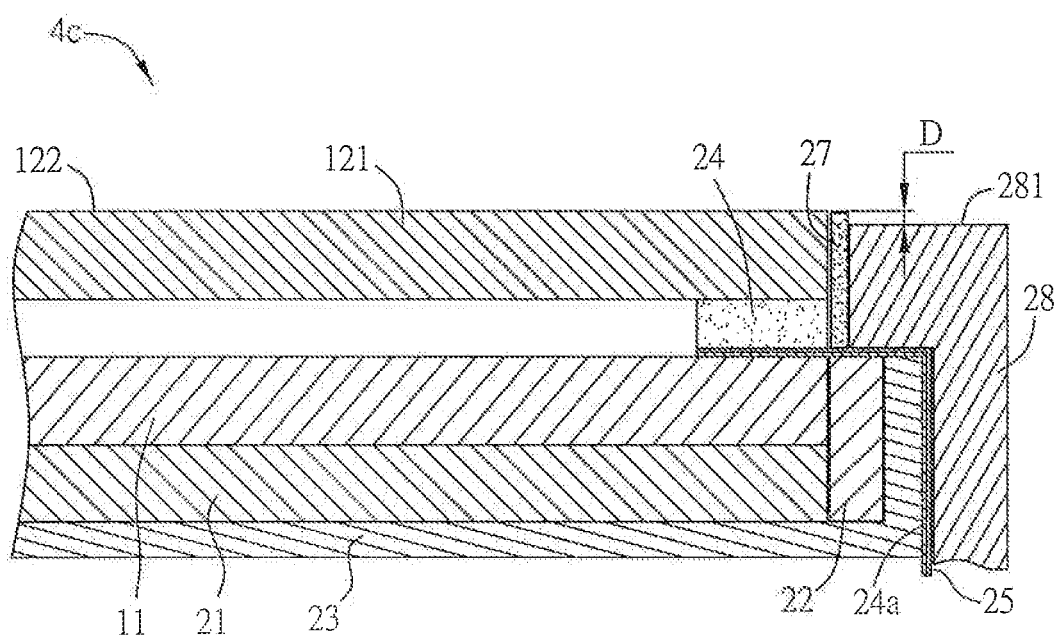

As shown in FIG. 9C, mainly different from the touch display apparatus 4a, the touch display apparatus 4c includes a light blocking element 25 which is disposed outside the back plate 23 and extends to the upper surface of the display panel 11 for blocking the undesired side light. Besides, another adhesive element 24a is disposed between the light blocking element 25 and the back plate 23 and between the light blocking element 25 and the display panel 11. By the adhesive elements 24 and 24a, the touch substrate 121 and the display panel 11 can be fixed to each other for avoiding the lateral relative movement therebetween. Other technical features of the touch display apparatus 4c can be known by referring to the touch display apparatus 4a, and therefore they are not described here for conciseness.

Figure 9D:
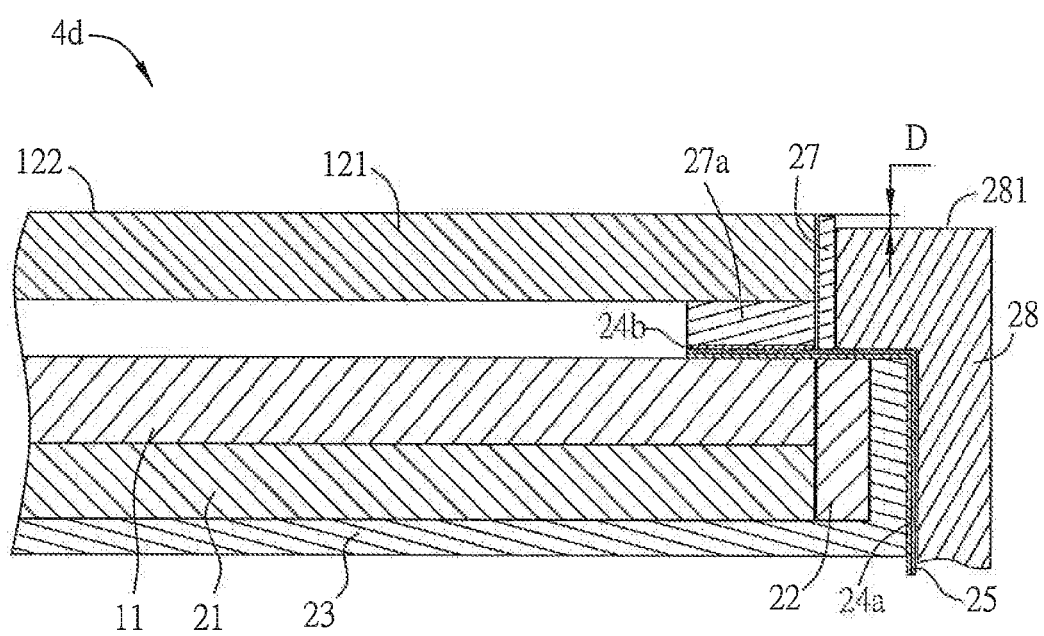

As shown in FIG. 9D, mainly different from the touch display apparatus 4c, the touch display apparatus 4d doesn't include the adhesive element 24 but includes a buffer pad 27a which is disposed between the touch substrate 121 and the display panel 11. Since the buffer pad 27a is disposed between the touch substrate 121 and the display panel 11, an adhesive element 24b is additionally disposed between the buffer pad 27a and the light blocking element 25 for fixing the touch substrate 121 and the display panel 11 to each other. By the adhesive elements 24a and 24b, the touch substrate 121 and the display panel 11 can be fixed to each other for avoiding the lateral relative movement therebetween. The adhesive elements 24a and 24b can use the same or different material according to the adhesive targets (e.g. the buffer pad 27a with the light blocking element 25, or the light blocking element 25 with the display panel 11 and back plate 23). Other technical features of the touch display apparatus 4d can be known by referring to the touch display apparatus 4c, and therefore they are not described here for conciseness.

In summary, in the touch display apparatus according to the invention, the display panel includes a first substrate and a second substrate disposed opposite to each other, the first substrate has a first side, the second substrate has a second side corresponding to the first side, and the first side is disposed beyond the second side. Besides, the touch panel includes a touch substrate. The second substrate is disposed between the touch substrate and the first substrate, and the area of the touch substrate is less than that of the second substrate. Thereby, in comparison with the conventional touch display apparatus, the touch display apparatus of this invention is configured with an innovative structure and uses the smaller touch panel, and therefore the cost of the touch display apparatus can be reduced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A touch display apparatus, comprising:
   a display panel including a first substrate and a second substrate disposed oppositely, wherein the first substrate has a first side, the second substrate has a second side corresponding to the first side, and the first side is disposed beyond the second side;
   a touch panel, including a touch substrate, wherein the second substrate is disposed between the touch substrate and the first substrate, and the area of the touch substrate is less than or equal to that of the second substrate, wherein the touch substrate has a third side, and the second substrate has a side corresponding to the third side, and the third side is disposed beyond the side of the second substrate corresponding to the third side; and
   a buffer element disposed between the touch substrate and the first substrate and adjacent to the third side of the touch substrate, wherein the buffer element has a lengthwise direction, and along the lengthwise direction, the buffer element has a first length, the first substrate has a second length and the touch substrate has a third length, and the first length is less than or equal to the second length and is larger than or equal to the third length.

2. The touch display apparatus as recited in claim 1, further comprising:
   a circuit connection board disposed to the touch substrate and electrically connected to the touch substrate.

3. The touch display apparatus as recited in claim 2, wherein the circuit connection board and the first substrate at least partially overlap each other on a projected plane parallel to the first substrate.

4. The touch display apparatus as recited in claim 2, wherein the circuit connection board and the second substrate at least partially overlap each other on a projected plane parallel to the second substrate.

5. The touch display apparatus as recited in claim 1, wherein the display panel further includes an optical film which is disposed between the second substrate and the touch substrate.

6. The touch display apparatus as recited in claim 1, further comprising:
   a backlight module disposed on the side of the display panel away from the touch substrate;
   a plastic frame adjacent to the backlight module, wherein the display panel is disposed to the plastic frame; and
   a back plate, wherein the plastic frame and the backlight module are disposed to the back plate.

7. The touch display apparatus as recited in claim 6, wherein the plastic frame and the back plate are connected to each other by locking or adhesion.

8. The touch display apparatus as recited in claim 1, further comprising:
   a backlight module disposed on the side of the display panel away from the touch substrate;
   an adhesive element by which the touch substrate and the display panel are connected to each other; and
   a back plate to which the backlight module is disposed.

9. The touch display apparatus as recited in claim 6, further comprising:
   a light blocking element extending from the back plate to the edge of the touch substrate.

10. The touch display apparatus as recited in claim 8, further comprising:
    a light blocking element extending from the back plate to the edge of the touch substrate.

11. The touch display apparatus as recited in claim 6, further comprising:
    a front frame disposed at the edge of the touch substrate and including a blocking portion, which is disposed above the touch substrate and has a surface, wherein an angle is formed between an extension of the surface and an upper surface of the touch substrate, and the angle is between 5° and 30°.

12. The touch display apparatus as recited in claim 8, further comprising:
    a front frame disposed at the edge of the touch substrate and including a blocking portion, which is disposed above the touch substrate and has a surface, wherein an angle is formed between an extension of the surface and an upper surface of the touch substrate, and the angle is between 5° and 30°.

13. The touch display apparatus as recited in claim 1, further comprising:
    an appearance element disposed around the touch substrate and the display panel, wherein a top surface of the appearance element and a surface of the touch substrate have a height difference that is between 0 and 1 mm.

14. A touch display apparatus, comprising:
    a display panel including a first substrate and a second substrate disposed oppositely, wherein the first substrate has a first side, the second substrate has a second side corresponding to the first side, and the first side is disposed beyond the second side;

a touch panel, including a touch substrate, wherein the second substrate is disposed between the touch substrate and the first substrate, and the area of the touch substrate is less than or equal to that of the second substrate;

a backlight module disposed on the side of the display panel away from the touch substrate;

a plastic frame adjacent to the backlight module, wherein the display panel is disposed to the plastic frame;

a back plate, wherein the plastic frame and the backlight module are disposed to the back plate; and a light blocking element extending from the back plate to the edge of the touch substrate.

15. A touch display apparatus, comprising:

a display panel including a first substrate and a second substrate disposed oppositely, wherein the first substrate has a first side, the second substrate has a second side corresponding to the first side, and the first side is disposed beyond the second side;

a touch panel, including a touch substrate, wherein the second substrate is disposed between the touch substrate and the first substrate, and the area of the touch substrate is less than or equal to that of the second substrate;

a backlight module disposed on the side of the display panel away from the touch substrate;

an adhesive element by which the touch substrate and the display panel are connected to each other;

a back plate to which the backlight module is disposed; and a light blocking element extending from the back plate to the edge of the touch substrate.

\* \* \* \* \*